United States Patent
Page

(10) Patent No.: US 7,817,650 B2
(45) Date of Patent: Oct. 19, 2010

(54) DATA TRANSMISSION

(75) Inventor: Michael Page, Oxford (GB)

(73) Assignee: Sony United Kingdom Limited, Weybridge (GB)

( * ) Notice: Subject to any disclaimer, the term of this patent is extended or adjusted under 35 U.S.C. 154(b) by 958 days.

(21) Appl. No.: 11/219,241

(22) Filed: Sep. 2, 2005

(65) Prior Publication Data

US 2006/0050808 A1 Mar. 9, 2006

(30) Foreign Application Priority Data

Sep. 3, 2004 (GB) ................................ 0419620.0

(51) Int. Cl.
*H04L 12/54* (2006.01)
*G06F 15/16* (2006.01)

(52) U.S. Cl. .................. 370/411; 370/351; 370/389; 370/396; 370/400; 370/412; 709/203; 709/232; 709/247; 709/250

(58) Field of Classification Search ......... 370/235–503; 709/203, 232, 247, 250
See application file for complete search history.

(56) References Cited

U.S. PATENT DOCUMENTS

| | | | |
|---|---|---|---|
| 4,063,038 A | 12/1977 | Kaul et al. | |
| 6,480,477 B1 | 11/2002 | Treadaway et al. | |
| 6,807,183 B1 * | 10/2004 | Chow et al. | 370/401 |
| 7,039,116 B1 * | 5/2006 | Zhang et al. | 375/240.26 |
| 7,046,681 B2 * | 5/2006 | Siu et al. | 370/400 |
| 7,133,416 B1 * | 11/2006 | Chamdani et al. | 370/466 |
| 7,164,688 B2 * | 1/2007 | Grimbergen | 370/412 |
| 7,218,670 B1 * | 5/2007 | Lesea et al. | 375/226 |
| 7,239,642 B1 * | 7/2007 | Chinn et al. | 370/401 |
| 7,483,058 B1 * | 1/2009 | Frank et al. | 348/222.1 |
| 7,499,500 B2 * | 3/2009 | Page | 375/295 |
| 7,555,016 B2 * | 6/2009 | Page | 370/509 |
| 7,672,414 B2 * | 3/2010 | Page | 375/355 |
| 2002/0016850 A1 * | 2/2002 | Fritz et al. | 709/232 |
| 2004/0034718 A1 * | 2/2004 | Goldenberg et al. | 709/250 |
| 2004/0093440 A1 * | 5/2004 | Lakaniemi et al. | 710/29 |
| 2004/0199655 A1 * | 10/2004 | Davies et al. | 709/231 |
| 2004/0234000 A1 * | 11/2004 | Page | 375/259 |
| 2004/0249623 A1 * | 12/2004 | Selvidge et al. | 703/23 |

(Continued)

FOREIGN PATENT DOCUMENTS

EP 1 376 966 1/2004

(Continued)

*Primary Examiner*—Ayaz R Sheikh
*Assistant Examiner*—Venkatesh Haliyur
(74) *Attorney, Agent, or Firm*—Oblon, Spivak, McClelland, Maier & Neustadt, L.L.P.

(57) ABSTRACT

A data communication transmitting node is provided, the transmitting node comprising: a plurality of buffers for storing data from a respective plurality of input data streams; means for monitoring an occupancy level of each of the plurality of buffers to detect if the occupancy level is sufficient to provide a complete data block to the transmission stream; and a transmission controller operable to select, in turn, a buffer from the plurality of buffers to output a data block to a transmission data stream, the selection being performed according to a buffer selection order. If the buffer selected by the transmission controller is detected to have an insufficient occupancy level when selected, a dummy data block is supplied to the data transmission stream in place of a data block from the selected buffer.

9 Claims, 17 Drawing Sheets

U.S. PATENT DOCUMENTS

| | | | | |
|---|---|---|---|---|
| 2004/0267389 A1* | 12/2004 | Page | ............................ | 700/94 |
| 2005/0078683 A1* | 4/2005 | Page | ........................ | 370/395.5 |
| 2005/0213693 A1* | 9/2005 | Page | ........................... | 375/354 |
| 2005/0281255 A1* | 12/2005 | Davies et al. | ................ | 370/389 |
| 2006/0050808 A1* | 3/2006 | Page | ........................... | 375/295 |
| 2006/0050825 A1* | 3/2006 | Page | ........................... | 375/356 |
| 2009/0103441 A1* | 4/2009 | Nakamura | .................. | 370/241 |

FOREIGN PATENT DOCUMENTS

JP    2006120122 A  *  5/2006

* cited by examiner

| octet | Bit | | | | | | | |
|---|---|---|---|---|---|---|---|---|
| | 7 | 6 | 5 | 4 | 3 | 2 | 1 | 0 |
| 1 | sync flag | edge 1 count bits 14:8 | | | | | | |
| 2 | edge 1 count bits 7:0 | | | | | | | |
| 3 | sync flag | edge 2 count bits 14:8 | | | | | | |
| 4 | edge 2 count bits 7:0 | | | | | | | |

Fig. 6

DATA TRANSMISSION

BACKGROUND OF THE INVENTION

1. Field of the Invention

This invention relates to data transmission.

2. Description of the Prior Art

It is known to transmit data from a plurality of input data streams across a communication link in packetised form. For certain types of data traffic, such as, for example, streamed audio or streamed video data, it is a required that the data communication system should provide low and deterministic latency and high reliability.

In the case of streamed audio data, there are a variety of known multi-channel audio interconnection technologies available on the market which use standard cabling infra structures. Most of these known systems are based on networking technologies with distributed routing. According to a previously proposed technique a data communication system is provided that uses the physical layer of Fast Ethernet (100 Mbits/s) to provide a point to point connection for digital audio data. However, there is an increasing demand on the capacity of such systems and a requirement to handle an increasing diversity of different audio data formats including high-resolution data formats.

SUMMARY OF THE INVENTION

Accordingly, there is a need for a data transmission technique that offers the capability of handling a diversity of different data formats yet is able to comply with the stringent latency constraints of streamed data formats in a reliable manner.

According to one aspect this invention provides a data communication transmitting node comprising:

a plurality of buffers for storing data from a respective plurality of input data streams;

means for monitoring an occupancy level of each of the plurality of buffers to detect if the occupancy level is sufficient to provide a complete data block to the transmission stream; and a transmission controller operable to select, in turn, a buffer from the plurality of buffers to output a data block to a transmission data stream, the selection being performed according to a buffer selection order;

in which, if the buffer selected by the transmission controller is detected to have an insufficient occupancy level when selected, a dummy data block is supplied to the data transmission stream in place of a data block from the selected buffer.

The invention recognises that by reading out data in turn from buffers corresponding to respective input data streams and supplying a dummy data block to the data transmission stream if the occupancy level of the buffer is insufficient to provide a complete data block to the data transmission stream, more even flow rates of the payload data can be achieved which results in more efficient processing of input data streams have different characteristic data rates. Furthermore, the consistency and evenness of the flow of the payload data achieved by insertion of the dummy blocks at reduces the buffering requirements at both the transmitting and receiving nodes. Since buffering necessarily implies latency, it follows that the invention offers reduced latency and more control over the latency of the data transmission system.

According to a second aspect, the invention provides transmitting method for use in a data communication system, the method comprising the steps of:

storing data from a respective plurality of input data streams in a plurality of buffers;

monitoring an occupancy level of each of the plurality of buffers to detect if the occupancy level is sufficient to provide a complete data block to the transmission stream; and selecting, in turn, a buffer from the plurality of buffers to output a data block to a transmission data stream, the selection being performed according to a buffer selection order so that if the buffer selected by the transmission controller is detected to have an insufficient occupancy level when selected, a dummy data block is supplied to the data transmission stream in place of a data block from the selected buffer.

Various other respective aspects and features of the invention are defined in the appended claims. Features from the dependent claims may be combined with features of the independent claims as appropriate and not merely as explicitly set out in the claims.

BRIEF DESCRIPTION OF THE DRAWINGS

The above and other objects, features and advantages of the invention will be apparent from the following detailed description of illustrative embodiments which is to be read in connection with the accompanying drawings, in which:

FIG. 6 schematically illustrates the contents of a representative one of the timing information headers of FIG. 5;

DESCRIPTION OF THE PREFERRED EMBODIMENTS

According to a previously proposed system, the physical layer of Fast Ethernet (IEEE802.3 100BASE-TX) can be used to communicate a plurality of audio channels having data in different audio formats on a single link having a channel bit rate of 100 Mbits/s. That link is a category 5 unshielded twisted pair cable, which has four signal pairs. Two of the signal pairs are used for transmission and reception of audio data whilst the remaining two signal pairs are used to convey a sample clock in both directions across the link. The sample clock is used to maintain audio sample synchronisation.

The physical layer data communication link described in this previously proposed system is capable of supporting a wide range of audio sample rates including 1-bit delta-sigma-modulated oversampled formats and 384 kHz PCM format. An example range of audio formats supported by this 100 Mbit point-to-point Ethernet physical layer interconnection is specified in Table 1 below. For example, it can be seen from Table 1 that the link can support 48 channels in each direction of 44.1 kHz PCM data or 24 channels in each direction of 2.8224 MHz DSD data.

TABLE 1

| Audio format | Sample frequency | Channels (each way) 100 Mbps link |
|---|---|---|
| 24-bit AES3-compatible PCM | 44.1 kHz | 48 |
| | 48 kHz | 48 |
| | 88.2 kHz | 24 |
| | 96 kHz | 24 |
| | 176.4 kHz | 12 |
| | 192 kHz | 12 |
| | 352.8 kHz | 6 |
| | 384 kHz | 6 |
| 24-bit PCM, no AES3 metadata | 352.8 kHz | 8 |
| 1-bit delta-sigma modulated | 2.8224 MHz | 24 |
| | 5.6448 MHz | 12 |

The 100 Mbits/s point-to-point physical layer link conveys audio sample clock frequency and phase information in both directions across the link and audio throughput does not occur until it is established that the devices either end of the link have synchronised their audio sample clocks. The audio latency is a fixed number of audio sample periods, the number being dependent upon the audio mode. However, the latency is always less than 100 microseconds. The link is bi-directional and symmetrical. Some of the bandwidth of the point-to-point link is reserved for auxiliary data, which is multiplexed amongst the audio streams. The audio channel data is circuit-switched (with low latency) whereas the auxiliary data is packet switched.

Figure 1:
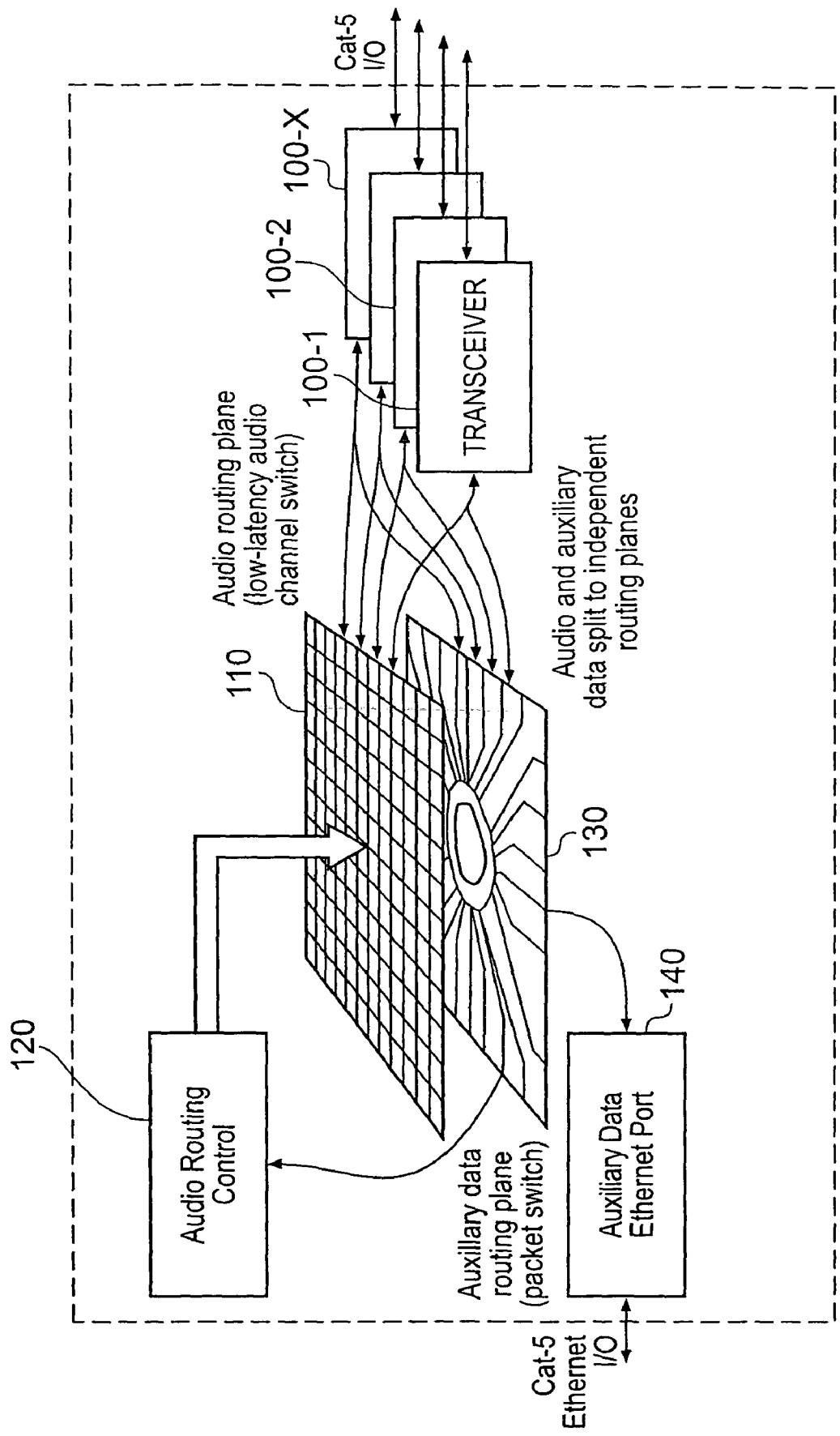
FIG. 1 schematically illustrates the architecture of a router according to the present technique.

FIG. 1 schematically illustrates the architecture of a router according to the present technique. The router comprises: a plurality, NX of transceivers 100-1 to 100-X operable to transmit and receive data across the Ethernet physical layer; an audio channel circuit-switch 110; an audio routing control module 120; a auxiliary data packet switch 130; and an auxiliary data Ethernet port 140. The transceivers 100-1 to 110-X transmit and receive data via the Ethernet physical layer. The routing is performed differently for the audio data and for the auxiliary data so that the audio data and auxiliary data are logically separated, for the purpose of routing, into two independent planes as shown in FIG. 1. The audio data routing plane comprises a low latency audio channel circuit-switch 110 whereas the auxiliary data routing plane comprises a packet switch 130 that implements standard Ethernet switching integrated circuits. The audio routing control module 120 controls the audio-channel switching process, which enables audio routing between any input and any output in a similar way to a cross-point switch. The auxiliary data Ethernet port 140 manages routing of the auxiliary data. The Ethernet port 140 is connected to a local host microprocessor system, which is operable to control the audio routing. Thus the router may be remotely controlled from any transceiver node.

According to the present technique a higher capacity Gigabit (known as 1000 BASE-T) Ethernet point-to-point link is provided. This can be considered to provide eight parallel data transmission paths, in each direction, each transmission path having the same capacity (100 Mbps) as the previously proposed system referred to above. Furthermore, rather than being multiplexed with the audio data, the auxiliary data is transported across the Gigabit link in separate frames at a rate of 100 Mbits/s (full duplex). The audio formats and sample rates for the Gigabit point-to-point link are specified in Table 2 below. Note that the number of channels for each audio format in Table 2 is simply eight times the corresponding number of channels specified in Table 1 (100 Mbps link) for the corresponding audio format.

Recall that the 100 Mbps link utilises a category 5 cable. The Gigabit link may utilise either copper cable or alternatively optical fibre. The copper cable is a Category-5e/6 cable, which is appropriate for carrying 1000 BASE-T physical layer data and is suitable for link lengths of up to 100 meters. The optical fibre is an IEEE802.3 1000 BASE-SX compliant multi-mode fibre, which is suitable for spanning distances of up to 500 meters for a multi-mode optical fibre. Longer spans are possible using single-mode optical fibre.

TABLE 2

| Audio format | Sample frequency | Channels (each way) Gigabit link |
|---|---|---|
| 24-bit AES3-compatible PCM | 44.1 kHz | 384 |
| | 48 kHz | 384 |
| | 88.2 kHz | 192 |
| | 96 kHz | 192 |
| | 176.4 kHz | 96 |
| | 192 kHz | 96 |
| | 352.8 kHz | 48 |
| | 384 kHz | 48 |
| 24-bit PCM, no AES3 metadata | 352.8 kHz | 64 |
| 1-bit delta-sigma modulated | 2.8224 MHz | 192 |
| | 5.6448 MHz | 96 |

Figure 2:
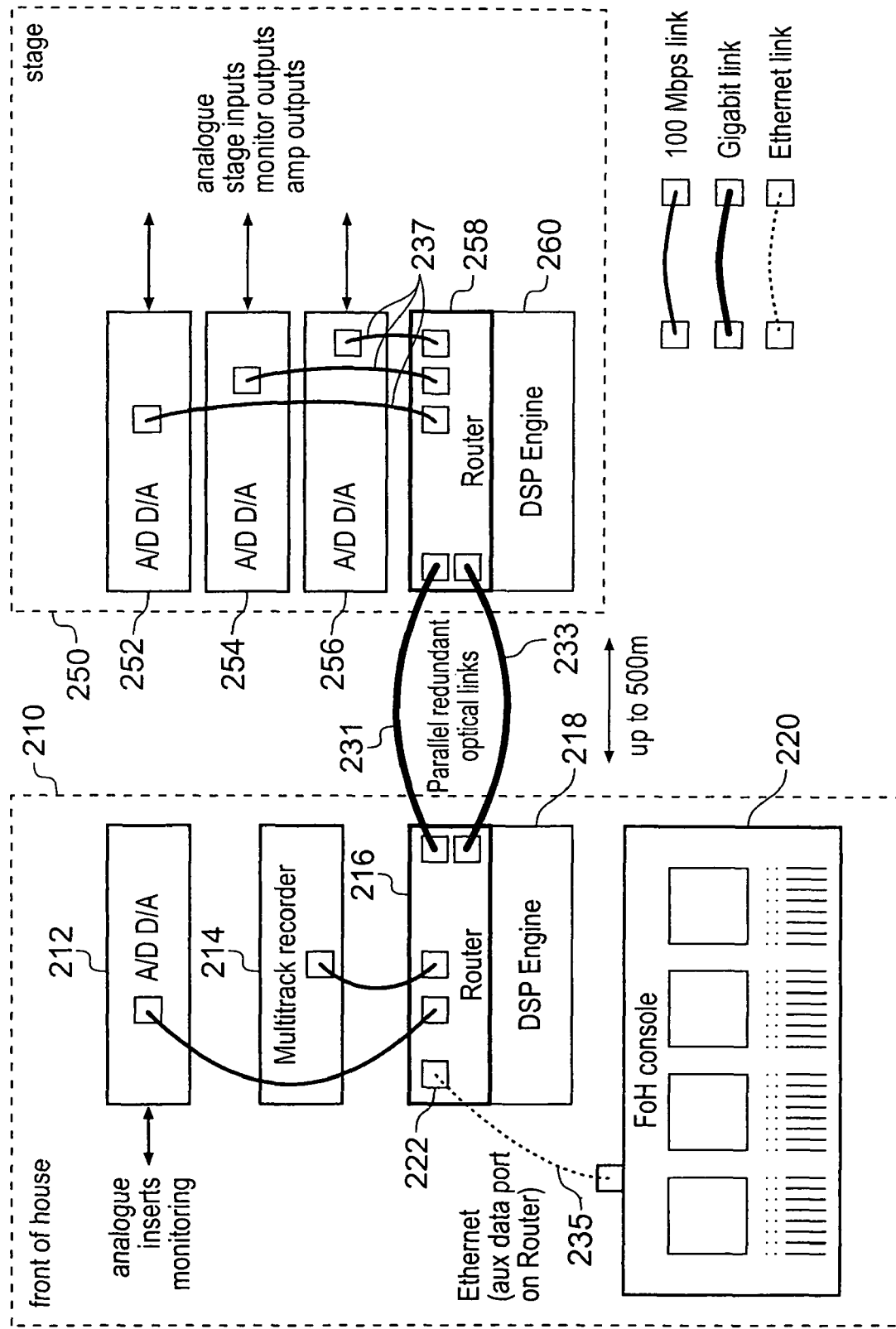
FIG. 2 schematically illustrates a live sound production system that implements a Gigabit point-to-point physical layer link.
Figure 3:
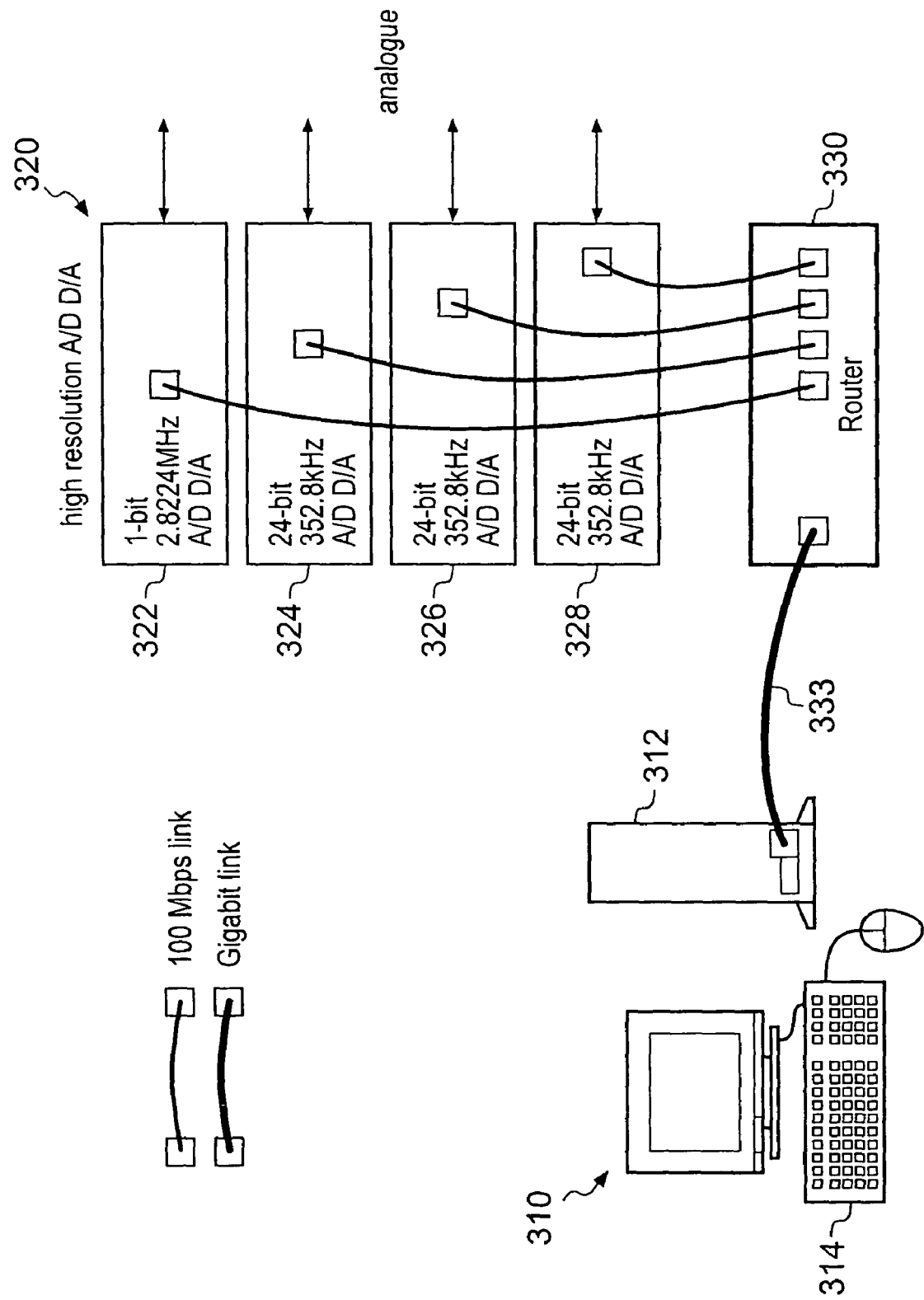
FIG. 3 schematically illustrates a high-resolution audio workstation arrangement that implements a Gigabit point-to-point physical layer link.
Figure 4:
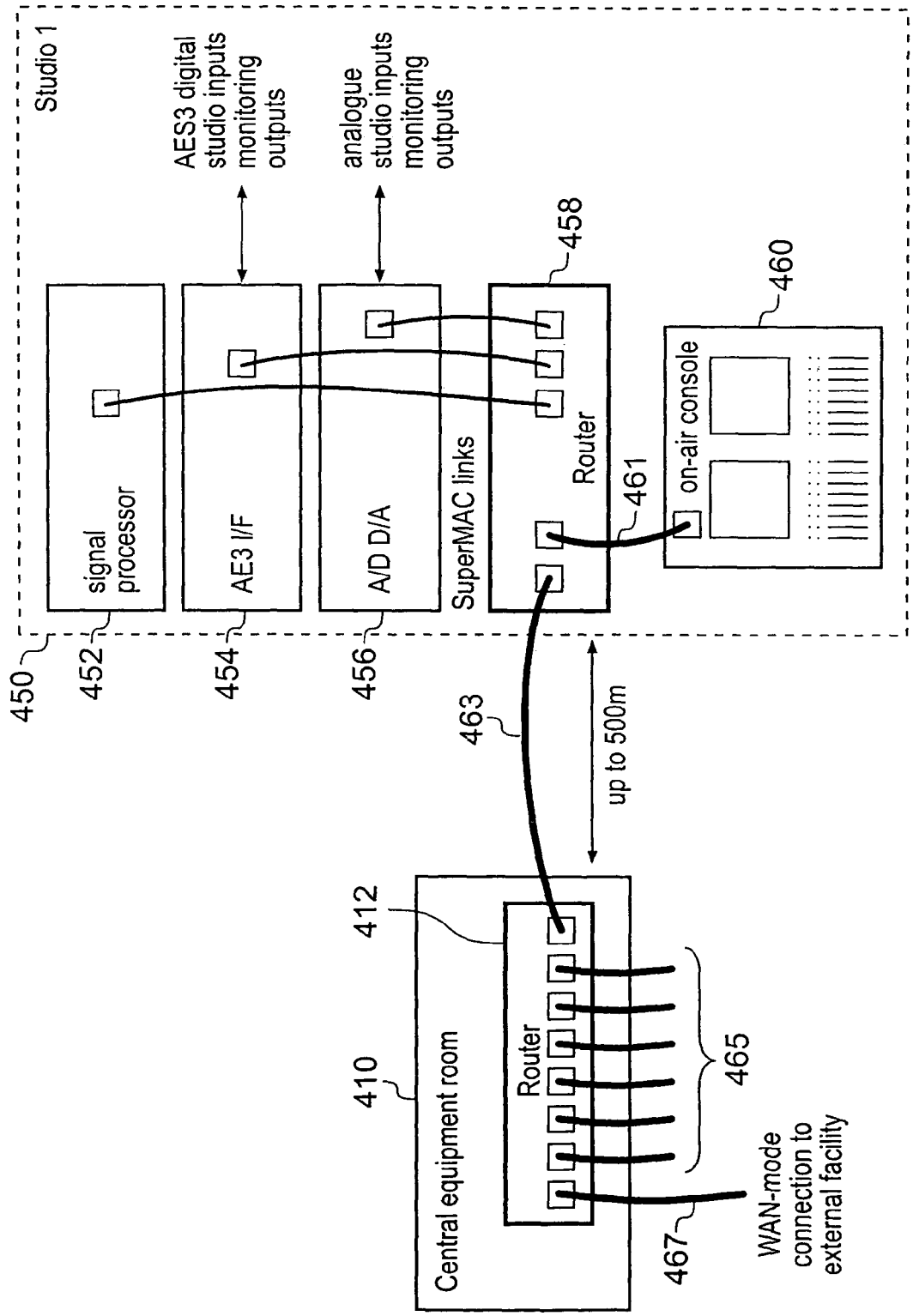
FIG. 4 schematically illustrates an audio broadcast studio arrangement that implements a Gigabit point-to-point physical layer link.

The Gigabit point-to-point physical layer link according to the present technique can be considered to be complementary to the known 100 Mbps point-to-point physical layer link described above. The channel count requirements for audio data interconnections are typically dependent upon the required number of channels of analogue-to-digital (A/D) conversion. Since the hardware associated with the Gigabit point-to-point physical layer link is currently (at the time of filing) significantly more expensive than the hardware associated with the 100 Mbps physical layer link, it may be advantageous to use both the 100 Mbps link and the Gigabit link for different connections in an audio data system. Some important example applications that may require a channel count greater than the 100 Mbps link can accommodate are: live sound systems, which may require link spans of over 300 m between the stage and the front-of-house equipment; ultra-high resolution audio processing systems such as 352.8 kHz PCM audio, which are likely to require large channel counts; and broadcast studio systems which typically require both large channel counts and large link spans between broadcast studios. FIGS. 2, 3 and 4 schematically illustrate examples of audio data systems that implement a Gigabit point-to-point physical layer link according to the present technique.

FIG. 2 schematically illustrates a live sound production system. The system includes a "front of house" equipment set 210 comprising: a digital-to-analogue (D/A)/analogue-to-digital (A/D) converter 212, a multi-track recorder 214, a first router 216 a first digital signal processing (DSP) engine 218 and a front of house console 220. The system also includes a stage equipment set 250 comprising: a suite of three A/D/D/A converters 252, 254, 256, a second router 258 and a second DSP engine. The routers 216, 258 are integrated into the chassis of the respective DSP engine 218, 260. Each router 216, 256 has both 100 Mbps link ports and Gigabit link ports.

In the front-of-house equipment, the A/D/D/A converter 212 and the multitrack recorder 214 are each connected to the first router 216 via a 100 Mbps point-to-point physical layer link.

In the stage equipment, each of the suite of A/D/D/A converters 252, 254, 256 is connected to the second router 258 via a 100 Mbps point-to-point physical layer link 237. The 100 Mbps links 237 between the converters 252, 254, 256 and the second router 259 also provide paths for auxiliary data (limited to about 5 Mbps each way) that is used for remote gain control and mute control of the A/D/D/A converters 252, 254, 256.

The first router 216 and the second router 258 communicate via two parallel Gigabit point-to-point physical layer links 231, 233 according to the present technique, operating on multi-mode optical fibre. The DSP engines 218, 260 are controlled by transporting Ethernet control and status data on the Gigabit links 231, 233.

An auxiliary data port 222 of the first router is connected to the front-of-house console 220 via an Ethernet link 235. Thus the front-of-house console 220 remotely controls the first router 216. The first and second routers 216 and 258 operate according to the principles illustrated by FIG. 1.

In the stage equipment 250, the A/D/D/A converters 252, 254, 256 are connected to the second router 258 for microphone inputs and monitoring of front-of-house outputs whereas in the front-of-house equipment 210, the A/D/D/A unit is connected to the first router 216 for monitoring of analogue inserts (corresponding to signals received from the stage).

In the arrangement of FIG. 2, all audio data and control data as well as the system clocks are carried over the 100 Mbps and Gigabit physical layer links.

If the system is operating in 96 kHz 24-bit PCM mode (see Table 1) then each 100 Mbps link introduces six samples of latency and each Gigabit link 231, 233 introduces two samples of latency.

Consider, for example the longest critical path with regard to latency in the system of FIG. 2. The longest critical path is the circuitous route from the stage 250, to front-of-house 210, through an analogue insert in the A/D/D/A 212 and back to the stage. The latency incurred at each stage of this route is detailed in Table 3 below. From Table 3 it can be seen that the total latency contributed by all of the 100 Mbps and Gigabit physical layer links and the two routers 216, 258 amounts to 292 microseconds. This is significantly less than the typical latency of a standard A/D/A converter. It will be appreciated that other large-scale digital mixing console applications such as music recording and film or television post-production systems are also suitable for implementation of 100 Mbps and Gigabit physical layer links in a manner similar to the system illustrated in FIG. 2.

TABLE 3

| Link | Latency (samples) | Latency (microseconds) |
| --- | --- | --- |
| 100 Mbps link 257: stagebox to stage router | 6 | |
| Gigabit link 231: stage to FoH | 2 | |
| 100 Mbps link: FoH router to insert A/D/A | 6 | |
| 100 Mbps link: insert A/D/A to FoH router | 6 | |
| Gigabit link 233: FoH to stage | 2 | |
| 100 Mbps link 237: stage router to stagebox | 6 | |
| Total: | 28 | 291.6667 |

FIG. 3 schematically illustrates a high-resolution audio workstation arrangement according to the present technique. The arrangement comprises a workstation 310 having a system unit 312, a keyboard 314 and a high resolution A/D D/A converter 320 having an eight-channel 1-bit 2.8224 MHz converter module 322, and three eight-channel 24-bit 352.8 kHz PCM converter modules 324, 326, 328. A router 330 is provided, which has four 100 Mbps point-to-point links to each of the four converter modules 322, 324, 326 and 328 and a Gigabit link 333 that connects the router to a peripheral component interconnect (PCI) card within the system unit 312 of the workstation 310. The Gigabit link 333 transfers all of the 352.8 kHz PCM and 2.8224 MHz 1-bit audio streams between the A/D D/A converter 320 and the workstation 310. The workstation 310 is used to control operations of the router 330 and each of the four A/D D/A modules 322, 324, 326, 328. Control data is passed across the auxiliary data routing plane of the router 330. As for the system of FIG. 2, all audio clocks are also communicated via the 100 Mbps and Gigabit physical layer links.

FIG. 4 schematically illustrates an audio broadcast studio arrangement according to the present technique. The apparatus connects a central equipment room 410 to a production studio 450. A router 412 is situated in the central equipment room 410. The production studio 450 has a suite of equipment comprising a signal processor 452, an AES3 interface 454 operable to receive AES3 format digital studio inputs and to supply monitoring outputs and an A/D D/A converter 456, which is operable to receive analogue studio inputs and to supply monitoring outputs. The signal processor 452, the AES3 interface 454 and the A/D D/A converter 456 each have a respective 100 Mbps link to the router 458. An on-air control console 460 is connected to the studio router 458 via a Gigabit link 461. A further Gigabit link 463 connects the studio router 458 to the central equipment room router 412. The optical fibre of the Gigabit link 463 can be up to 500 m long. The central equipment room router 412, in addition to the Gigabit link 463 from the studio 450, has independent Gigabit links 465 to six other studios as well as a Wide Area Network (WAN) Gigabit link 467 to an external facility. Each of the Gigabit links in this arrangement carries 384 channels (see Table 2) of 48 kHz PCM audio from a studio to the central router 412.

As outlined above, the 100 Mbps physical layer link employs a Category-5 cable and uses two of the signal pairs for transmission and reception of audio data and the remaining two spare signal pairs for transmitting a high-frequency sample clock in each direction. However, for the Gigabit physical layer link, there are no spare links on the Category-5e/6 cable for dedicated transmission of clock signals and the optical interfaces have only a single bearer in each direction. Accordingly, another way of transmitting the clocking information on the Gigabit link is provided. The Gigabit link is arranged to convey up to four asynchronous audio sample clock domains. These four sample clocks are denoted audio "base clocks". Note that the phrase "base clock" is used in this description in a general sense to refer to a clock signal and is not related to any specific meaning otherwise defined in the audio engineering field. The four possible audio base clocks according to this arrangement are:

Base clock A: 44.1 kHz±100 ppm (parts per million)

Base clock B: 48 kHz±12.5%

Base clock C: 44.1 kHz±12.5%

Base clock D: 48 kHz±100 ppm

Thus the minimum possible base clock frequency is 38.5875 kHz (44.1 kHz-12.5%) whilst the maximum possible base clock frequency is 54 kHz (48 kHz+12.5%). Since many implementations do not support ±12.5% operation, Base clock A is always arranged to operate at ±100 ppm to ensure compatibility. Each of the audio streams (see Table 2) should be synchronous with one of the four possible base clocks. A sample rate multiplier is assigned to each audio data stream specifying a factor by which to multiply the audio base clock to achieve the appropriate sample clock rate.

Table 4 below indicates for each of the available sample rates of Table 2, the associated base clock and sample rate multiplier.

TABLE 4

| Audio format | Sample frequency | Channels (each way) Gigabit link | Sample Rate Multiplier | Base Clock freq |
|---|---|---|---|---|
| 24-bit AES3-compatible PCM | 44.1 kHz | 384 | ×1 | 44.1 kHz |
| | 48 kHz | 384 | ×1 | 48 kHz |
| | 88.2 kHz | 192 | ×2 | 44.1 kHz |
| | 96 kHz | 192 | ×2 | 48 kHz |
| | 176.4 kHz | 96 | ×4 | 44.1 kHz |
| | 192 kHz | 96 | ×4 | 48 kHz |
| | 352.8 kHz | 48 | ×8 | 44.1 kHz |
| | 384 kHz | 48 | ×8 | 48 kHz |
| 24-bit PCM, no AES3 metadata | 352.8 kHz | 64 | ×8 | 44.1 kHz |
| 1-bit delta-sigma modulated | 2.8224 MHz | 192 | ×64 | 44.1 kHz |
| | 5.6448 MHz | 96 | ×128 | 44.1 kHz |

Note that not all of the four base clocks need be used in a particular implementation. For example consider an audio system having audio paths at three different sample rates as specified in Table 5 below. In this example audio base clocks C and D are unused whereas base clock A is associated with two different input data streams (but with different sample rate multipliers).

TABLE 5

| Sample rates of Application audio paths | Appropriate Base Clock | Sample rate multiplier |
|---|---|---|
| 176.4 kHz ± 100 ppm | Base clock A | ×4 |
| 88.2 kHz ± 100 ppm | Base clock A | ×2 |
| 48 kHz ± 12.5% | Base clock B | ×1 |

For the Gigabit physical layer link, clocking information for each of the audio base clocks is provided in a section of the audio frame header. The physical layer clock, which has a frequency of 125 MHz is used to convey the audio base clock timing information for each of the four audio base clocks.

Figure 5:
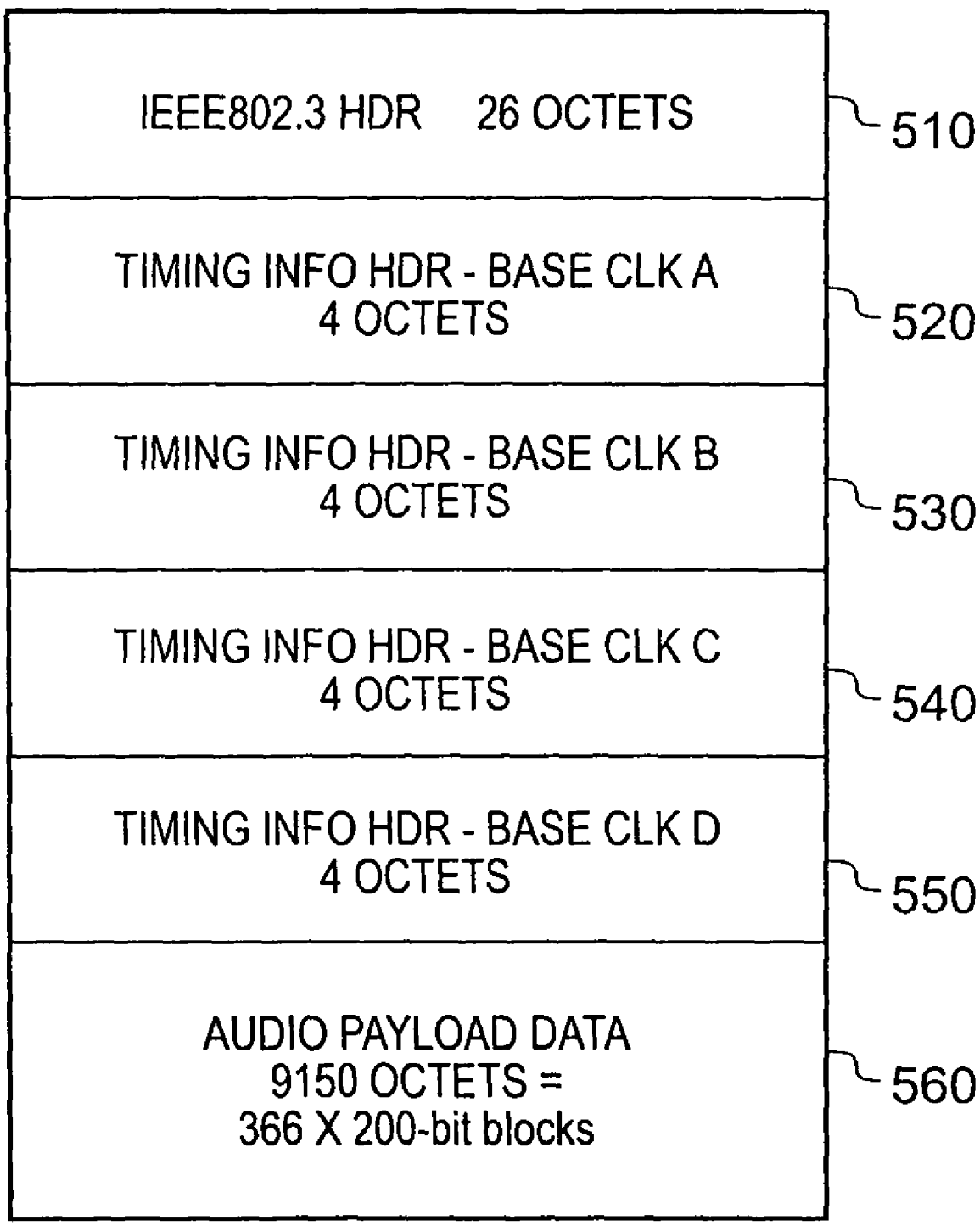
FIG. 5 schematically illustrates the audio frame structure according to the present technique comprising the timing information for all four base clocks in the frame header.

FIG. 5 schematically illustrates the audio frame structure according to the present technique comprising the timing information for all four base clocks in the frame header. The audio frame comprises a total of 9196 octets of data. The first twenty-six octets of header data 510 comprise eight octets of IEEE802.3 preamble data, six octets for Media Access Control (MAC) source and MAC destination address fields (ignored for point to point links), two octets that specify validity data for jumbo frames, two octets specifying the MAC type and two octets specifying the protocol ID. The MAC is an Ethernet protocol layer that has the functions of data encapsulation and media access management (collision avoidance and handling). The next portion of header data comprises four octets of timing information 522 for base clock A, four octets of timing information 524 for base clock B, four octets of timing information 526 for base clock C and four octets of timing information 528 for base clock D. The payload data 530 comprises 9150 octets arranged as 366×200-bit blocks.

FIG. 6 schematically illustrates the contents of a representative one of the timing information headers 522, 524, 526, 528. The four octets of timing information comprises a 15-bit value "edge 1 count" that specifies the number of 125 MHz Gigabit physical layer clock edges that occur between the end of an audio frame header and the next audio base clock "event" at the transmitter. The timing information also comprises a 15-bit "edge 2 count" that specifies the number of 125 MHz Gigabit physical layer clock edges that occur from the end of the frame header to the next-but-one (i.e. subsequent) audio base clock event.

Note that the audio base clock "events" are not actually audio base clock edges, rather they are clock edges corresponding to a clock having one quarter of the corresponding base clock frequency, that is frequencies in the range 9.64 kHz to 13.5 kHz. Recall that the audio base clock frequency range is 38.5875 kHz to 54 kHz. The highest order bit of the first octet and the highest order bit of the third octet are synchronisation flags. The synchronisation flag indicates that the associated base clock event is synchronous with a synchronisation marker having a frequency equal to the audio base clock divided by two thousand and forty-eight. These synchronisation markers are used for latency control.

Figure 7:
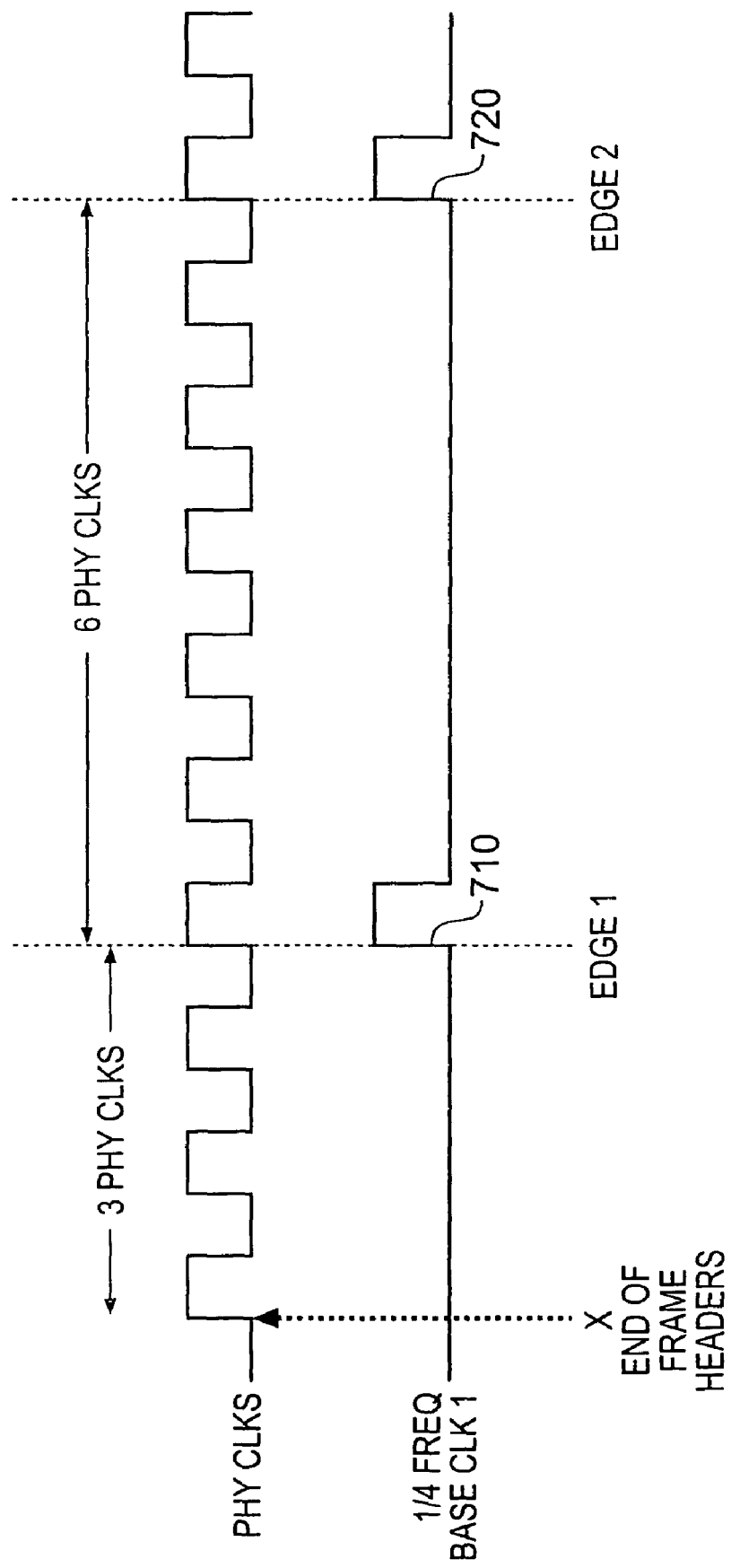
FIG. 7 schematically illustrates how the timing information is derived.

FIG. 7 schematically illustrates how the timing information is derived. As illustrated in FIG. 7, there are three physical layer clock edges between the end of the frame header and the next base clock event 710, whereas there are six plus three, giving a total of nine physical layer clock edges between the end of the frame header and the next-but-one base clock event 720. Thus in this simplified example, the "edge 1 count" value would be three (in decimal) whereas the "edge 2 count value" would be nine (in decimal). Clearly, the actual counts would be significantly higher since the physical layer clock has a frequency of 125 MHz whereas the (audio base clock)/4 frequency range is 9.64-13.5 kHz.

Figure 8:
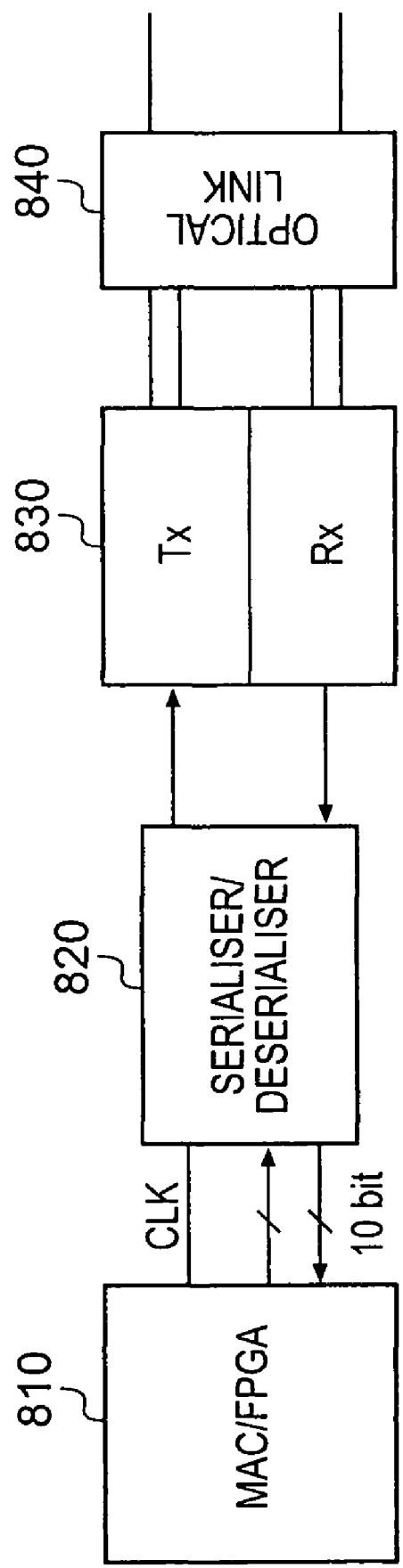
FIG. 8 schematically illustrates an arrangement for transmitting data onto and receiving data from the physical layer of the Gigabit link.

FIG. 8 schematically illustrates an arrangement for transmitting data onto and receiving data from the physical layer of the Gigabit link. The arrangement comprises a field programmable gate array (FPGA) 810, a serialiser/deserialiser 820, a transmit/receive module 830 and an optical link interface 840. The FPGA 810 assumes the role of the MAC in a traditional Ethernet system and thus performs the functions of data encapsulation and media access management. The FPGA 810 performs transmission and reception concurrently and implements a full-duplex data connection. Data is communicated between the FPGA 810 and the serialiser/deserialiser via a ten-bit wide transmit data bus and a 10-bit wide receive data bus. Data output by the FPGA onto the 10-bit data buses is clocked at the 125 MHz clocking rate of the Gigabit physical layer. The transmit/receive module 530 prepares data for output to the physical layer via the optical link 840. The edge count events 710, 720 of FIG. 7 should be timed relative to the point in the transmitter where the 10-bit signals are clocked out to the serialiser/deserialiser 820, that is, relative to the time when there is a transition between output of ten-bit header data portions and ten-bit payload data portions. This serves to compensate for pipeline delay and the time taken for ten-bit encoding. Similarly, on reconstruction of the audio sample clocks, the receiver should compensate for the pipelines and ten-bit decoding delays.

Figure 9:
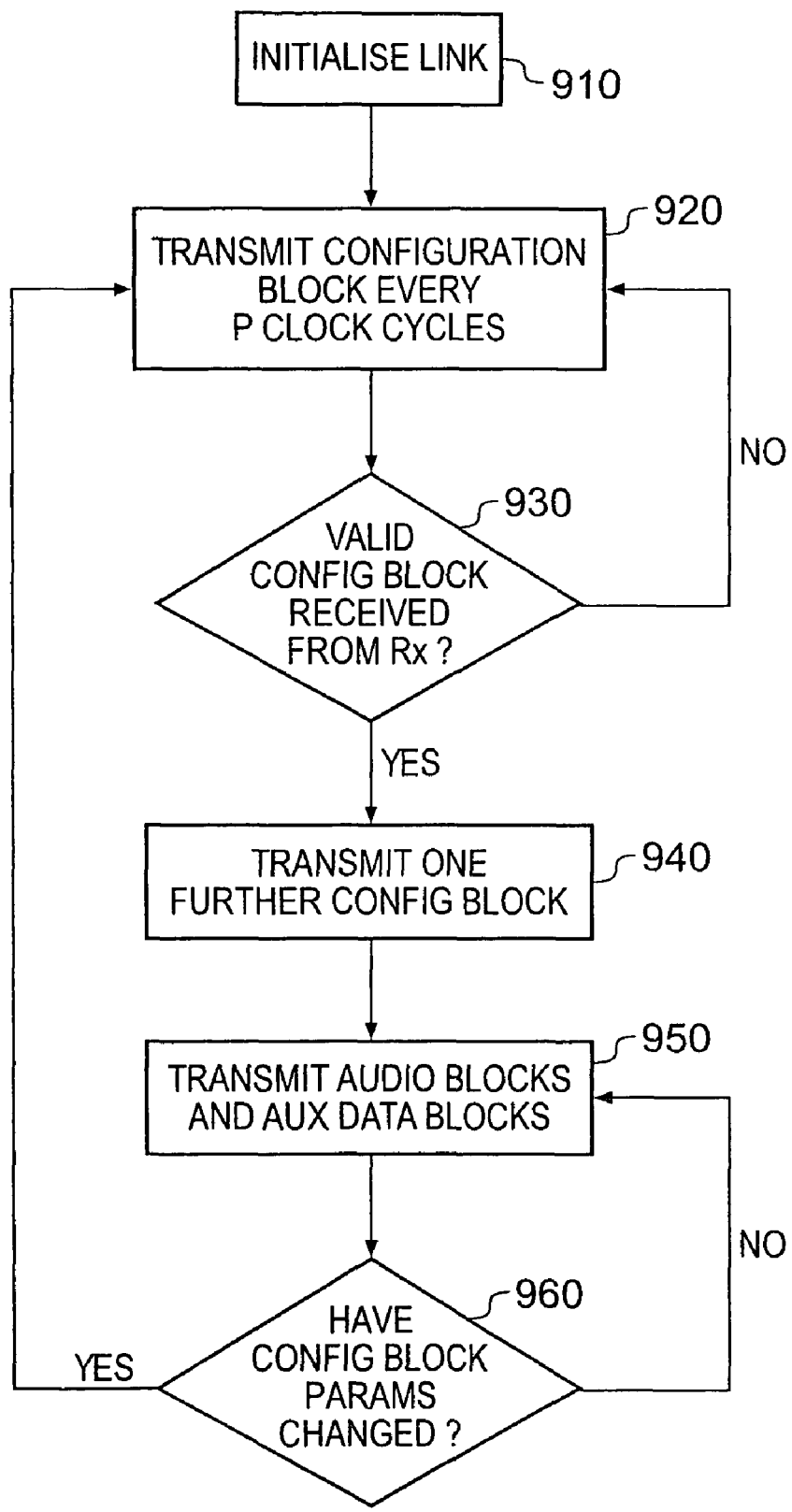
FIG. 9 is a flow chart that schematically illustrates how configuration data including data associating each audio data stream with one of the four possible base sample clocks is communicated between the transmitter and the receiver.

FIG. 9 is a flow chart that schematically illustrates how configuration data including data associating each audio data stream with one of the four possible base sample clocks is communicated between the transmitter and the receiver. The process begins at stage 910 where the Gigabit physical layer link is initialised. Note that audio data throughput does not occur until the transmitting and receiving devices have synchronised their audio sample clocks. At stage 920, transmission of configuration blocks is commenced. A configuration block is transmitted periodically (every P physical layer clock cycles) shortly after initiation of the link. Each configuration block comprises the following data:

The audio mode for each audio stream (including sample rate multiplier of Table 5)
Base clock selection for each audio data stream (from choice of four possible base clocks)
Data specifying the nominal frequency for each base clock
Tolerance value for each base clock (either ±100 ppm or ±12.5%)
Flag fields used to indicate that a valid configuration block has been received by the receiver and that the receiver is capable of operating in the audio modes requested (indications provided by the receiver rather than the transmitter)

At stage 930, the transmitter determines whether a valid configuration block has been sent back by the receiver in acknowledgement of the configuration data block(s) sent to it. If the receiver is capable of handling the requested audio modes then the acknowledgement configuration block will have indicator flags set to confirm that this is the case. If at stage 930, it is determined that no acknowledgement configuration block has been received from the receiver then the process returns to stage 920 and the transmitter continues to periodically transmit configuration data blocks to the receiver. However, if at stage 930 it is determined that an acknowledgement configuration block has been received then the process proceeds to stage 940 where the transmitter transmits one further configuration block. Following stage 940, at stage 950 the transmitting device having received an acknowledgement configuration block and transmitted one further configuration block, proceeds to transmit audio data blocks and auxiliary data blocks. The auxiliary data frames are transmitted between audio frames in the Gigabit link according to the present technique.

Transmission of audio and auxiliary data continues for as long as the configuration block parameters remain unchanged. However, if it is established at stage 960 that one or more of the configuration block parameters has in fact changed then the process returns to stage 920 where a modified configuration block is periodically transmitted to the receiving device. It will be appreciated that although in this arrangement, the configuration data is communicated in a dedicated data block on initiation of the link and in the event of any change to configuration data parameters, in alternative arrangements, the configuration data could be included, for example, in auxiliary data frames or in the audio frame headers.

Figure 10:
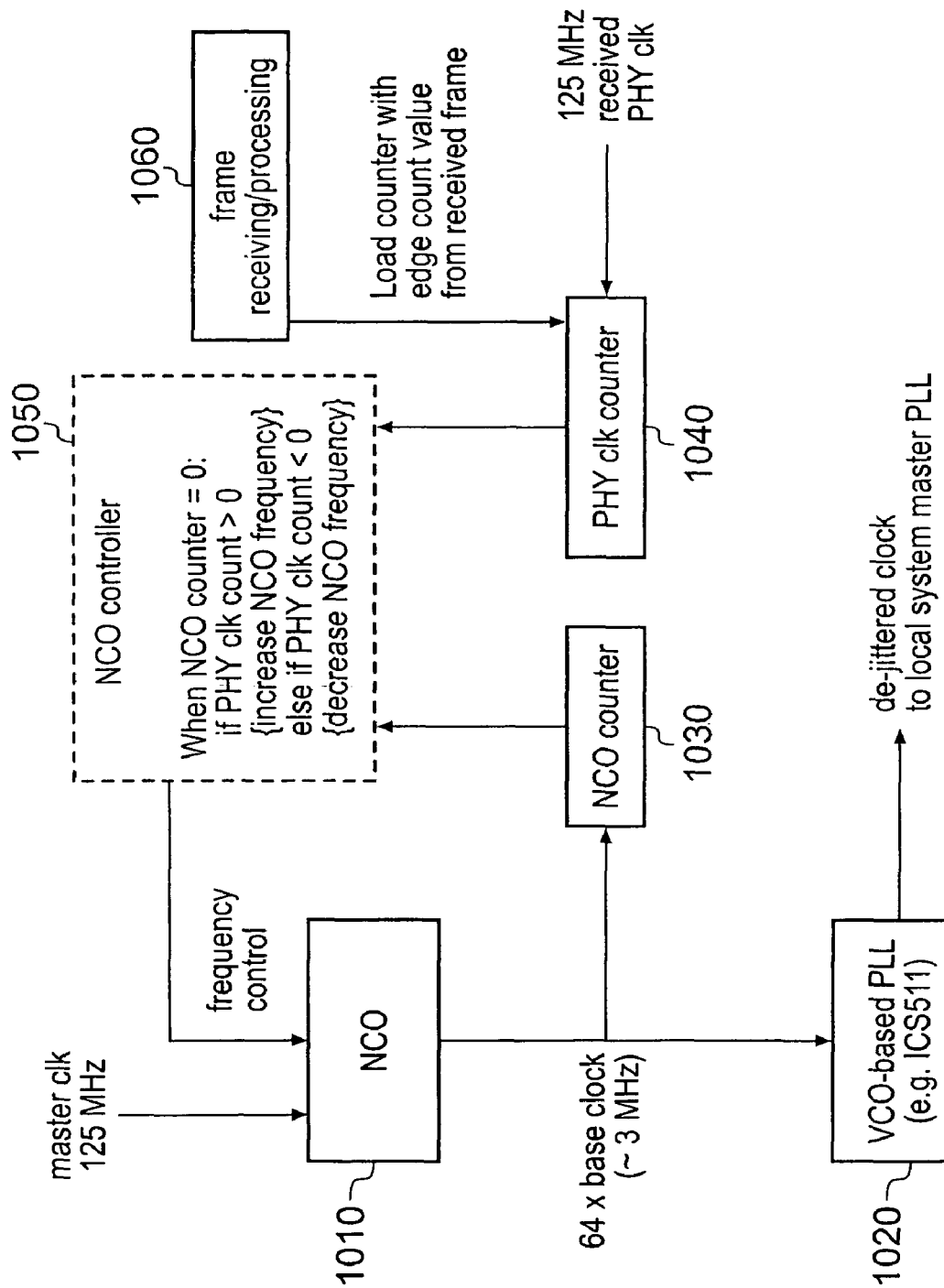
FIG. 10 schematically illustrates a receiver arrangement for audio base clock recovery.

FIG. 10 schematically illustrates a receiver arrangement for audio base clock recovery. The arrangement comprises a Numerically Controlled Oscillator (NCO) 1010, a Voltage Controlled Oscillator (VCO)-based Phase Locked Loop (PLL) 1020, an NCO counter 1030, a physical layer (PHY) clock counter 1040, an NCO controller 1050 and a frame receiving/processing unit 1060. The timing information for the audio base clock is supplied in the header data of the audio frame as illustrated in FIGS. 5 and 6. This timing information comprises two edge counts for each of four possible base clocks relative to the 125 MHz physical layer clock of the Gigabit link. Each edge count events represent clock edges of a clock having one quarter of the frequency of the corresponding base clock. The frequency of the (audio base clock)/4 events thus lies in the range 9.64 kHz to 13.5 kHz with at least eight nanoseconds $(8 \times 10^{-9} \text{ s} = 1/(125 \times 10^6 \text{ Hz}))$ of jitter incurred as a result of sampling the audio base clock events using the 125 MHz physical layer clock. The received timing data is sent to the PLL to remove the jitter and to multiply to usable audio sample clock frequencies. In the system of FIG. 10 the frame receiving/processing unit 1060 extracts the timing information from the audio frame headers 522, 524, 526, 528 and for each base clock in turn, loads the edge count value 710 from the received frame into the PHY clock counter 1040. The received 125 MHz PHY clock signal is also supplied as input to the PHY counter 1040 and is used to clock the counter. A 125 MHz master clock of the receiver is supplied as input to the NCO 1010. A clocking signal having a frequency of sixty-four times the audio base clock frequency is output by the NCO and supplied to both the NCO counter 1030 and the VCO-based PLL 1020 The NCO controller 1050 is arranged to control the NCO 1010 frequency in dependence upon a comparison between the values of the NCO counter 1030 and the PHY counter 1040. In particular, when the NCO counter 1030 reads zero, if the PHY counter 1040 count is greater than zero then the NCO 1010 frequency is increased whereas if the PHY counter 1040 count value is less than zero when the NCO counter 1010 value is equal to zero then the NCO 1010 frequency is decreased. Otherwise, if the NCO counter 1030 and PHY counter 1040 values are equal then no frequency adjustment is necessary. The output of the NCO 1010 is sent to the VCO-based PLL 1020, which is operable to supply a de-jittered clock signal to the master PLL of the receiver apparatus. The NCO may be required in order to obtain a sufficiently high-frequency base clock for sending to the VCO of the VCO-based PLL 1020. The VCO-based PLL 1020 serves to attenuate the base clock jitter to an acceptably low level (e.g. less than five hundred picoseconds—$500 \times 10^{-12}$ s) such that the clock signal can be used for a high-performance PLL of the receiver clock master.

As described above with reference to FIG. 5, audio data is transferred across the physical layer of the Gigabit link in audio data frames comprising a total of 42 octets of header data and 9150 octets of audio payload data. Table 6 below gives an overview of the Gigabit link audio frame format.

TABLE 6

| Field | Octets | Notes |
|---|---|---|
| preamble/SFD | 8 | See IEEE802.3 |
| MAC source | 6 | Ignored for point- |
| MAC destination | 6 | to-point links |
| Qtag TPID | 1 | Required for jumbo |
| Qtag TCI | 1 | frame validity |
| MAC type | 2 | Ethertype TBD |
| Protocol ID | 2 | Protocol ID TBD |
| Timing HDR | 16 | |
| Payload | 9150 | 366 25-octet blocks |
| FCS | 4 | CRC-32 |
| Total | 9196 | |

The audio data payload comprises 9150 octets, which for transmission across the link is divided into independent two-hundred bit (twenty-five octet) blocks. Each block comprises one-hundred and ninety-two bits of audio payload data corresponding to a single one of the eight data transmission paths across the Gigabit link plus an eight-bit block label. The eight-bit block label specifies:

The data transmission path of the Gigabit link with which the audio payload data is associated An Audio Stream Synchronisation Marker (ASSM) that specifies whether the audio data within the block derives from the start of an audio frame that was coincident with a (audio base clock/2048) synchronisation flag at the transmitter Each of the eight independent data transmission paths of the Gigabit link has an associated (first-in-first-out) FIFO buffer in the transmitter and a corresponding FIFO in the receiver.

Figure 11:
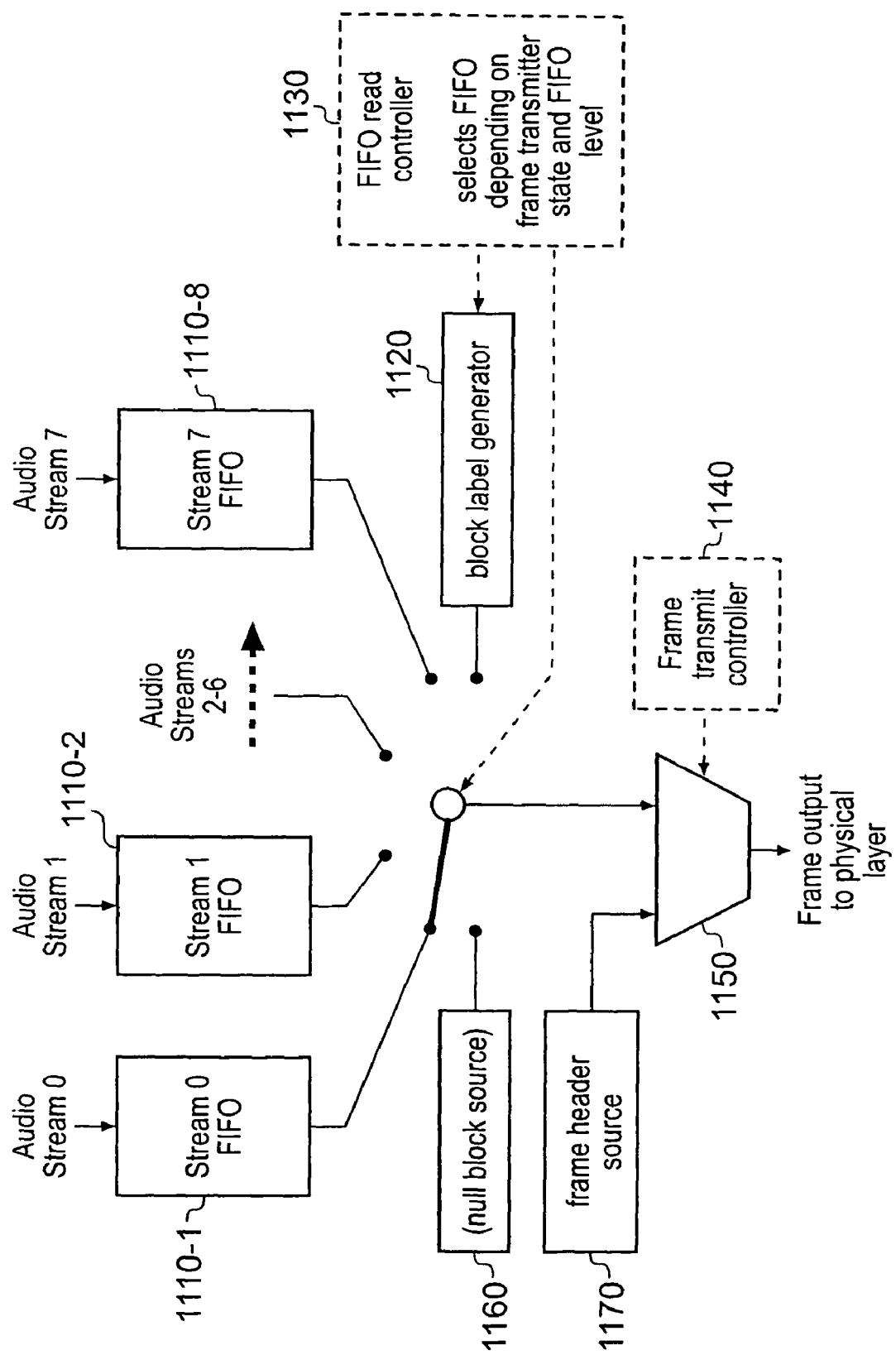
FIG. 11 schematically illustrates a Gigabit link transmitter buffering and frame assembly arrangement according to the present technique.

FIG. 11 schematically illustrates a Gigabit link transmitter buffering and frame assembly arrangement according to the present technique. The arrangement comprises: a series of eight FIFO buffers 1110-1 to 1110-8, one for each data transmission path of the Gigabit link; a block label generator 1120; a FIFO read controller 1130; a frame transmit controller 1140; a multiplexer 1150; a dummy data source 1160; and a frame header source 1170. Each of the eight FIFO buffers 1110-1 to 1110-8 is arranged to receive data from a corresponding input audio data stream. Data from the input audio streams may have different data formats and sample rates, each data format being selected from Table 2 above. The FIFO read controller 1130 reads a 192-bit block of data from different ones of the series of FIFO buffers 1110-1 to 1110-8 in turn by selecting the positioning of a switch 1132 according to a buffer order sequence. In this particular arrangement the ordering sequence is such that it progressively cycles through each of the eight FIFOs 1110-1 to 1110-8 in turn (i.e. the buffering order is cyclic). The read controller selects a FIFO from which to read data at an appropriate point in the frame transmission sequence in dependence upon the state of the frame transmit controller 1140.

However, when a particular FIFO has been selected by the FIFO read controller 1130, the current FIFO occupation level must be above a predetermined threshold for a data block to be read from the buffer and supplied to the data transmission stream via the multiplexer 1150. If there is insufficient data in the buffer (i.e. the occupation level at or below the predetermined threshold) then the FIFO read controller will set the switch to provide a data path from the dummy data source 1160 to the multiplexer 1150, so that instead of data from the currently selected FIFO, a block of dummy data will be inserted in the transport data stream in its place. Note that in alternative arrangements according to the present technique, the dummy data with an identifier need not be actively generated for insertion in the data stream. Alternatively, for example, the physical layer could output data such that there are effectively gaps between the frame payload blocks, which serve the same function of evening out the data flow as do the actively generated dummy data blocks.

The block label generator 1120 is arranged to associate an eight-bit block label to each audio data block read out from one of the FIFOs 110-1 to 110-8. The block label is transmitted before the associated block so that the receiver can determine which FIFO incoming data should be routed in advance. The frame transmit controller 1140 monitors the status of and controls the timing of frame transmission. The frame header source 1170 outputs audio frame header data (42 octets) to the multiplexer 1150 at the beginning of each data frame. The multiplexer supplies a data transmission stream comprising audio data frames to the physical layer of the Gigabit Ethernet link for transmission.

Figure 12:
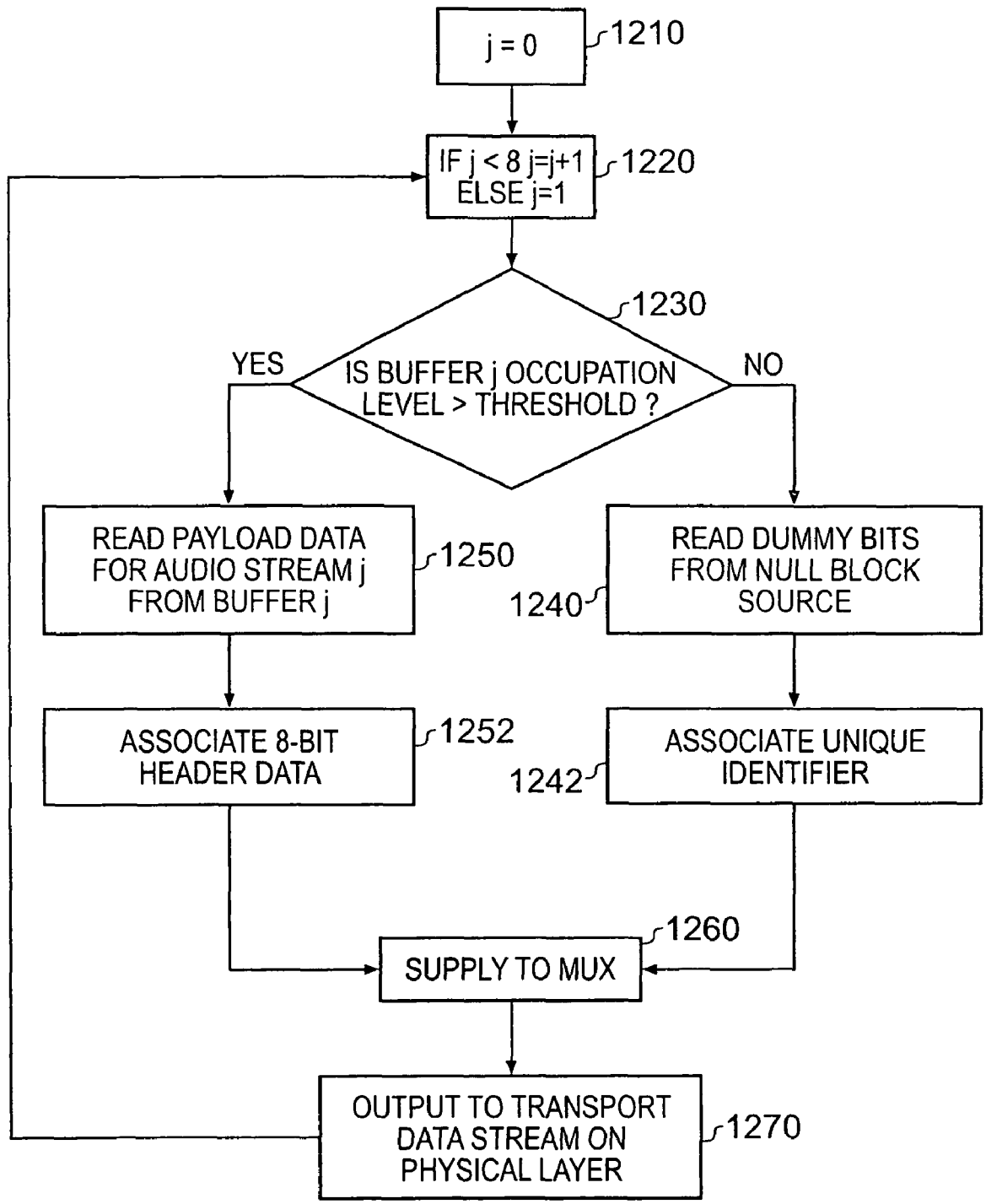
FIG. 12 is a flow chart that schematically illustrates how the apparatus of FIG. 11 implements the transmission buffering and frame assembly.

The flow chart of FIG. 12 schematically illustrates how the apparatus of FIG. 11 implements the transmission buffering and frame assembly according to the present technique. At stage 1210, the buffer index j is initialised to zero, then at stage 1220, j is incremented by unity so that the first 1110-1 of the eight FIFOs is selected. At stage 1230, the FIFO read controller 1130 (see FIG. 11) determines if the occupancy level of buffer j is greater than 191 bits (the predetermined threshold). If this condition is not satisfied then the FIFO read controller 1130 sets the position of the switch 1132 to the dummy data source 1160 and 192 bits of dummy data are read out. Following from stage 1240, next at stage 1242 an eight-bit unique identifier is associated with the dummy data to distinguish the dummy data block from audio payload data. Otherwise, if at stage 1230, it is determined that the selected FIFO does have a current occupation level above the predetermined threshold, then the process proceeds to stage 1250 whereupon 192 bits of audio payload data is read from the buffer under the control of the FIFO read controller 1130. Next, at stage 1252 an appropriate 8-bit block label, which identifies the input data stream j is associated with the audio payload data. This 8-bit block label comprises no routing data and no protocol data. At stage 1260 either the 200-bit dummy block from stage 1252 or the two-hundred bit audio data block from stage 1242 is supplied to the multiplexer 1150 for output to the transmission data stream on the Gigabit Ethernet physical layer at stage 1270. The process then proceeds successively to the next buffer in the selection ordering by returning to stage 1220, where the value of j is incremented (unless j=8, in which case j is reset to 1, corresponding to the first buffer in the ordering sequence) and process continues. In alternative arrangements the threshold could be less than 192 bits at the start of the data block transmission, provided that the threshold is sufficiently high to ensure that 192 bits are delivered by the end of the block. Furthermore, in alternative arrangements the buffer order need not be cyclic and could, for example, be pseudorandom. However, the cyclic buffer order has the advantage of the lowest latency because the receiver buffering requirements are less than for the alternative buffer orders.

Figure 13:
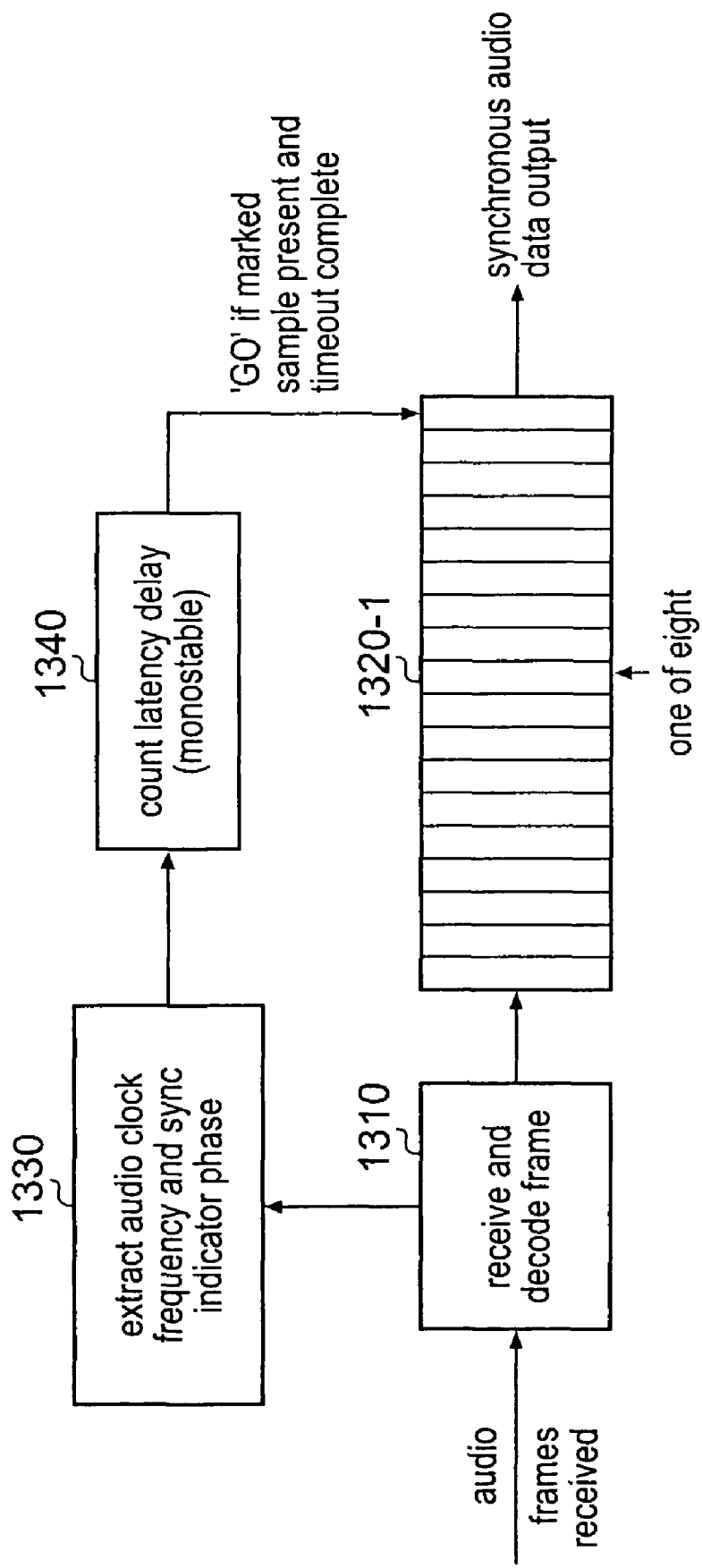
FIG. 13 schematically illustrates representative portion of a frame reception and buffering arrangement of a receiving device corresponding to the transmitting device arrangement of FIG. 11.

FIG. 13 schematically illustrates representative portion of a frame reception and buffering arrangement of a receiving device corresponding to the transmitting device arrangement of FIG. 11. FIG. 13 shows a representative one of eight buffer reception arrangements. The arrangement comprises a decode unit 1310, a receiver FIFO 1320-1, a clock extraction unit 1330, and a monostable counter 1340. The decode unit 1310 receives framed data that has been transmitted across the physical layer of the Gigabit link and decodes the framed data using the audio frame header data (see Table 6 above). The 8-bit block labels of the audio data blocks are used by the decode unit 1310 to direct the audio payload data to an appropriate one of the eight receiver FIFOs in dependence upon which one of the input audio data streams the audio payload data block is associated. The audio sample synchronisation mechanism described above with reference to FIGS. 5, 6 and 7 are employed to ensure that the phase of the audio sample clock and the frequency of the master clock are substantially identical (neglecting small phase offsets due to propagation delay) at each end of the Gigabit link. At the transmitter audio payload samples that are received from the local audio system at the same time as the (audio base clock)/2048 synchronisation marker are tagged via a field in the timing information header (see FIG. 6). This synchronisation marker is used by the corresponding receiver FIFO 1320-1. The occurrence of a synchronisation flag, specified by the timing information (see FIG. 6) in the audio frame header triggers the monostable timer 1340 in the receiver, which generates a timeout delay equal to a predetermined latency of the link. Audio output from the receiver is inhibited until the monostable timer delay has expired. Thus if an audio sample having a synchronisation marker set is present in the receiver FIFO 1320-1 and the monostable counter 1340 indicates that the timeout value has expired then synchronous audio data output from the receiver FIFO 1320-1 is initiated. The timeout delay implemented by the monostable timer 1340 is set to be slightly longer than the maximum delay due to both propagation and processing through the Gigabit link. In order to support variable sample rates, the timeout delay is specified as a number of audio samples, rather than an absolute time value.

Figure 14A:
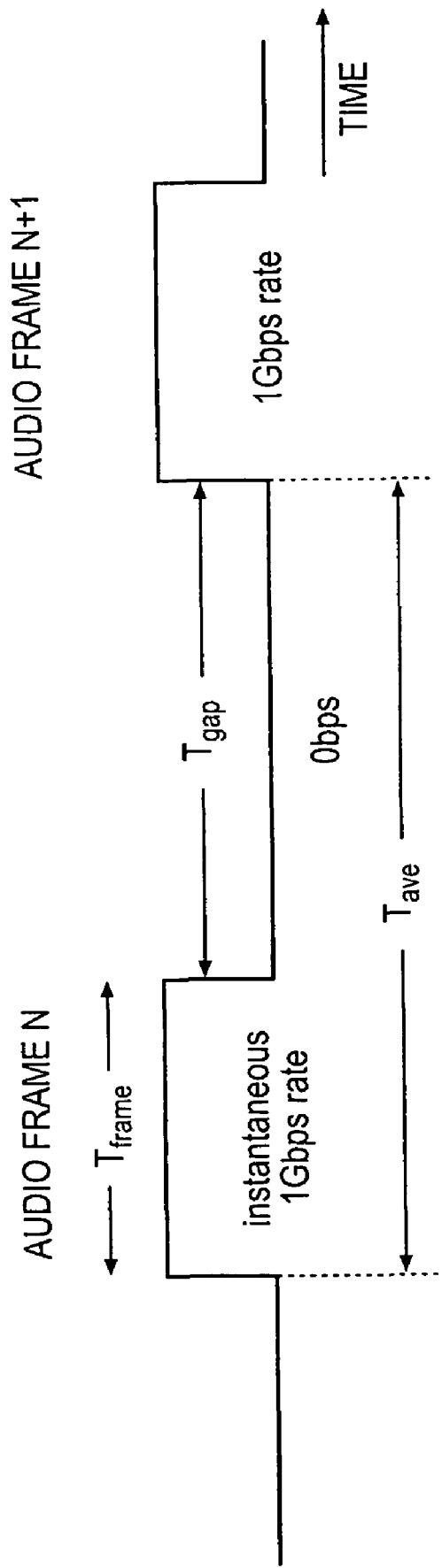
FIG. 14A schematically illustrates how the audio data frame is transmitted across the Gigabit link.

FIG. 14A schematically illustrates how the audio frame payload is transmitted across the Gigabit link. The burstiness of the data flow is due to the packetised transmission. The data of audio frame N (header and payload) is transmitted across the Gigabit Ethernet link at an "instantaneous" transmission rate of 1 Gigabit per second (1.25 Gbps with 20% overhead). The instantaneous data transmission rate corresponds to the data rate over the timescale $T_{frame}$. At the receiver audio data will be output as eight separate continuous data streams at respective data rates corresponding to the associated base clock frequencies. Note that the multiplier factors (see Table 4) do not affect this output data rate because the channel count alters to compensate for this.

Figure 14B:
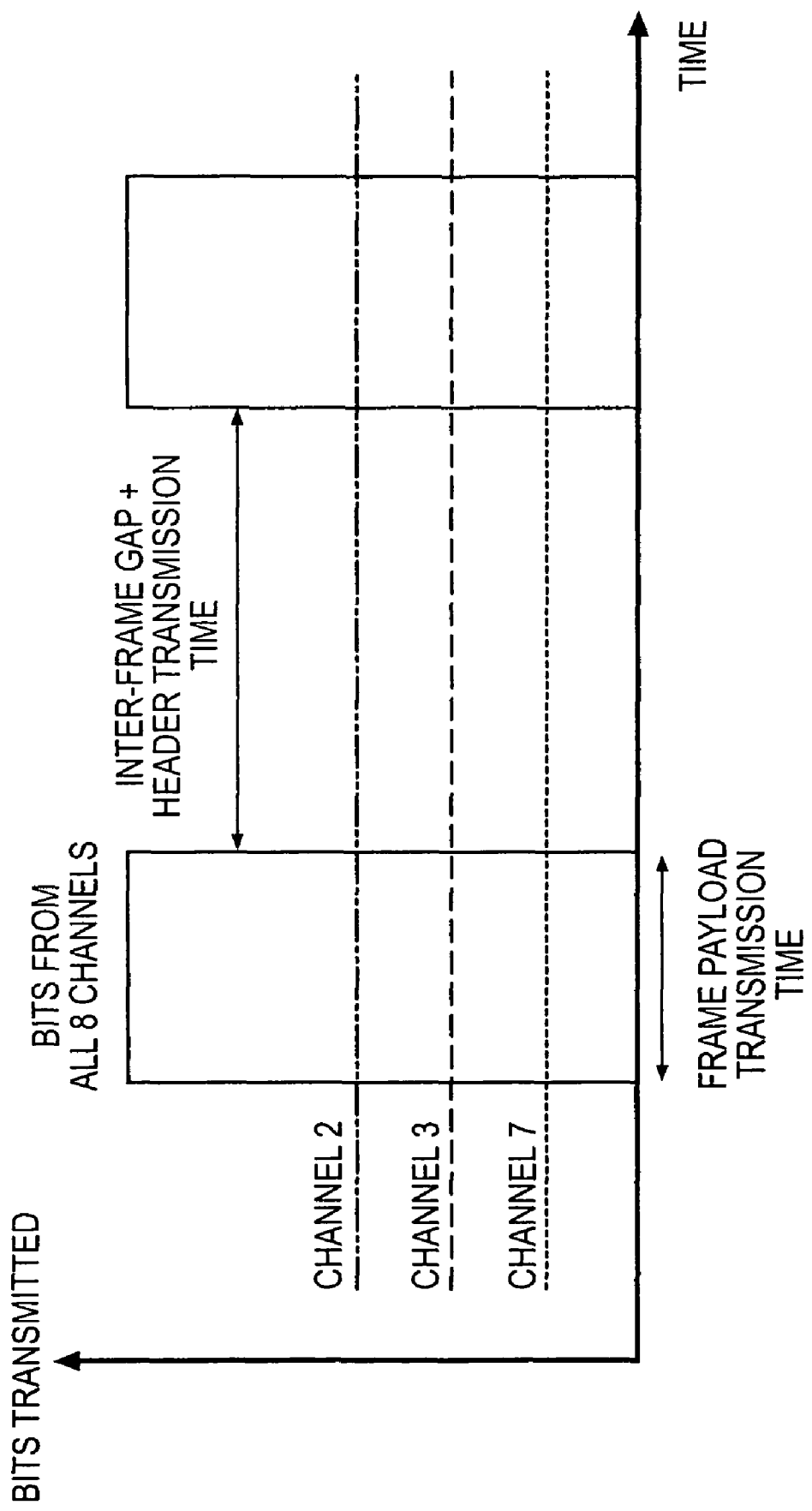
FIG. 14B schematically illustrates an instantaneous packetised data flow together with continuous data flows for three of the eight channels.

FIG. 14B schematically illustrates an instantaneous packetised data flow of the audio data payloads (excluding frame headers) together with continuous data flows for three of the eight channels. Audio payload data from all eight channels is transmitted during a frame payload transmission time (less than $T_{frame}$ of FIG. 14A due to subtraction of header transmission time) as shown in FIG. 14B. The audio payload data of each burst will be distributed at the receiver across eight output streamed data channels, the appropriate output channel for each data block being specified by the associated block label. Shown alongside the instantaneous data flow in FIG. 14B are continuous output data flows of a representative three of the eight streamed output channels. Each of the three channels, channel 2, channel 3 and channel 7 in FIG. 14B carries data corresponding to a different audio format (selected from the formats listed in Table 2). Accordingly, the three channels have different streamed data rates. Channel 2 has the maximum output data rate in this case. It will be appreciated that the instantaneous transmission rate in the bursts should be sufficiently high to compensate for the inter-frame gaps to ensure that the continuous output data rates can be sustained.

Accordingly, there is a latency constraint whereby the "averaged data rate" given by total number of bits per channel contained in an audio frame divided by the time $T_{ave}$ (which is the sum of $T_{frame}$ and the inter-frame gap time $T_{gap}$) should be greater than or equal to the continuous data rate of any one of the eight channels. Thus the latency constraint to be imposed is:

audio payload data rate per channel averaged over $T_{ave}$ $(=T_{frame}+T_{gap})\geq$maximum output audio data rate (continuous) at receiver The maximum output audio data rate at the receiver in this case corresponds to the audio format from Table 2 of 24-bit PCM (24 audio bits plus 4 bits of AES 3 metadata) at (48 kHz+12.5%=54 kHz), having a total of 384 channels each way (48 channels per stream). this gives a maximum output audio data rate of 28 bits×48 channels×54 kHz=72.6 Mbps. The audio frame transmission time=9196×8 bits/1 Gbps=73.5 microseconds, whereas the auxiliary data transmission time=1540×8 bits/1 Gbps=12.3 microseconds. Accordingly, the potential equivalent continuous data rate of the Gigabit link=(192 bits×366/8=8784 bits)/(73.5+12.3 microseconds)=102.4 Mbps. Thus, in this arrangement, the Gigabit link has a capacity in excess of that needed to support the maximum data rate with an acceptable level of latency.

As explained above, the latency constraint is that the potential equivalent continuous data rate (102.4 Mbps) should be greater than or equal to the maximum data rate (72.6 Mbps). For input data streams having less than the maximum data rate, null data may be inserted in the payload of the audio data stream to compensate for the difference between the maximum data rate and the actual data rate of the particular input data stream. This ensures a more even flow of data from the input data streams across the physical layer link.

Figure 15:
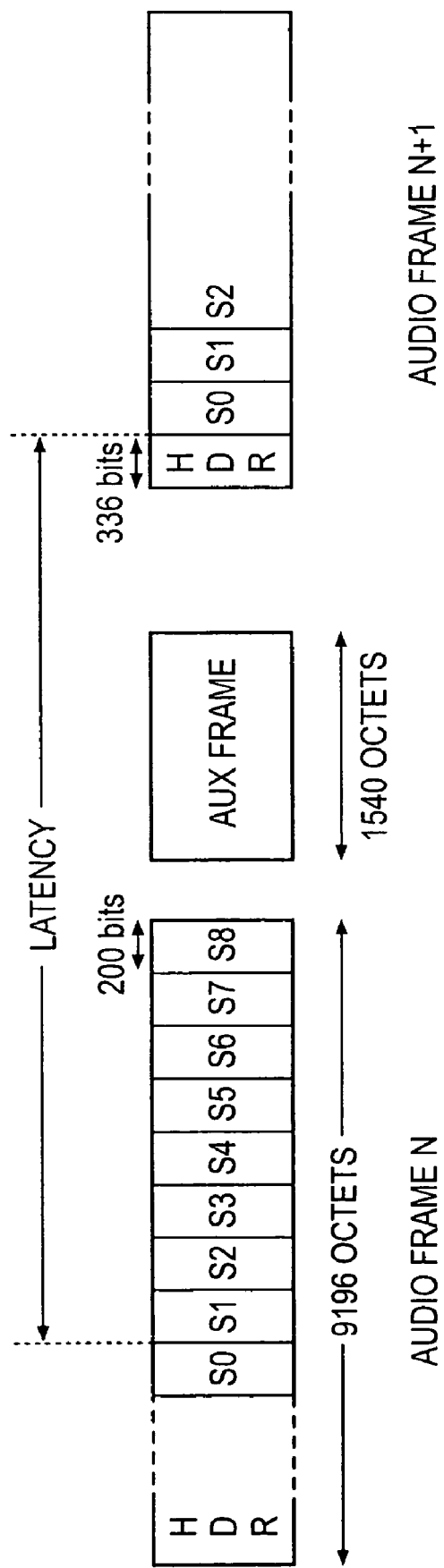
FIG. 15 schematically illustrates a frame transmission sequence on the Gigabit link comprising two audio data frames and an intervening auxiliary data frame.

FIG. 15 schematically illustrates a frame transmission sequence on the Gigabit link comprising two audio data frames and an intervening auxiliary data frame. Each audio data frame comprises 42 octets (336 bits) of header data and 388 200-bit blocks of payload data (comprising a block label of 8 bits per 200-bit block). The intervening auxiliary data frame comprises a total of 1540 octets (12320 bits). Audio data systems may require a very low latency (significantly less than 100 microseconds) for acceptable operation. The overall latency can be considered to be roughly proportional to the maximum duration of interruptions in the transport stream of audio payload data, the interruptions being due, for example, to inter-frame gaps and transmission of auxiliary data frames between successive audio frames. In order to comply with the latency constraints the transmitter FIFO buffer should have a capacity that is at least sufficient to bridge the audio data interruptions. However, since buffering in the transmitter incurs latency it is desirable to keep the buffer capacity as low as possible. Referring to FIG. 15, the buffer capacity should comprise sufficient data to bridge the gap between the end of audio payload transmission of one audio frame and the beginning of the audio payload transmission of the next audio frame and thus encompasses the duration of the transmission of the auxiliary data frame plus the time taken to transmit an audio frame header. According to the present arrangement 12.9 microseconds is the maximum gap in audio data transmission assuming that an auxiliary data frame of maximum size is transmitted in between the two audio frames.

To accommodate the different continuous output audio data rates at the receiver the maximum output data rate should be considered in order to maintain a continuous data output despite the inter-frame gaps. However, for audio streams that are output at less than this maximum data rate dummy data blocks could be used to even out the payload data flow so that audio payload data arrives at the receiver at a rate consistent with the required continuous output data rate. Dummy data bits may also be inserted in the audio frame payload of the link capacity exceeds that required to satisfy the latency constraint described above. The insertion of blocks comprising dummy data into the transport data stream was described above with reference to FIG. 11.

Figure 16A:
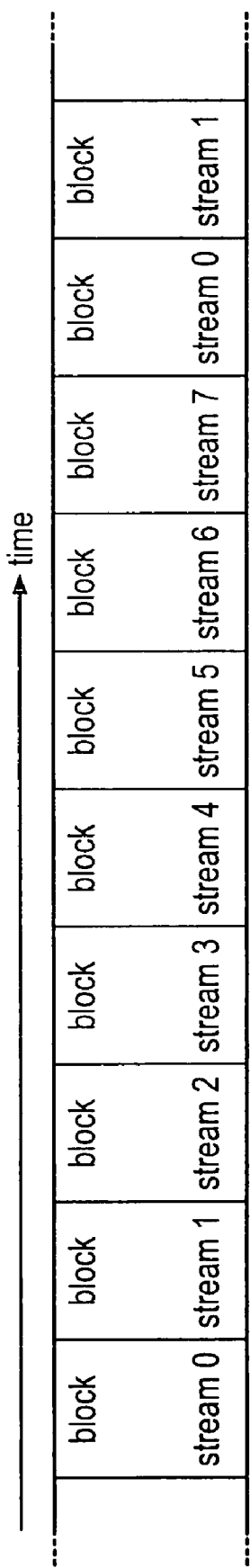
FIGS. 16A and 16B schematically illustrate sequences of data blocks that are supplied to a multiplexer of FIG. 11.
Figure 16B:
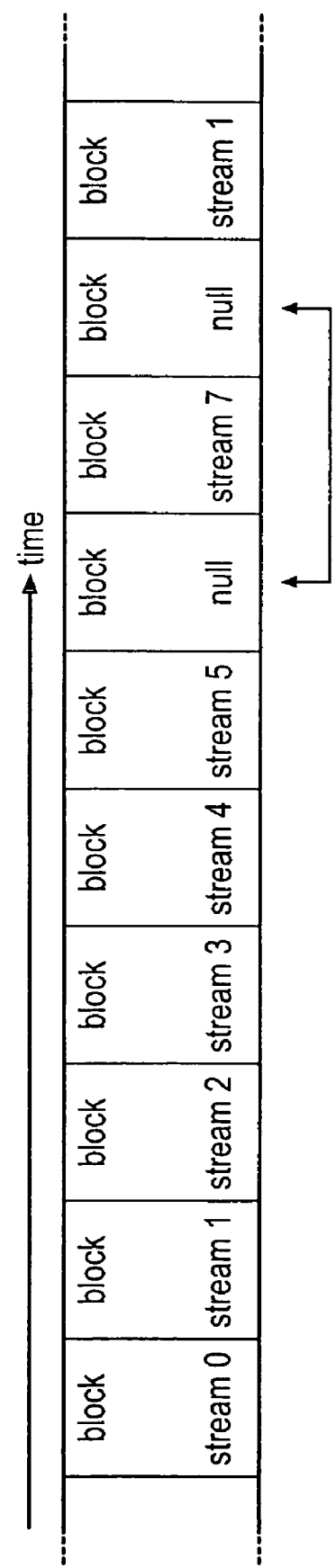

FIGS. 16A and 116B schematically illustrate sequences of data blocks that are supplied to the multiplexer 1150 of FIG. 11 according to the present technique. In FIG. 15A all of the eight input data streams are operating at the maximum data rate so that the data blocks supplied to the multiplexer 1150 comprise blocks of audio payload data read from each of the eight transmitter FIFOs 1110-1 to 1110-8 in turn. In this case the Gigabit link capacity is just able to accommodate the maximum data rate of the link so no dummy data blocks are output to the multiplexer. However FIG. 16B shows a sequence of data blocks that is supplied to the multiplexer when stream 0 and stream 6 are associated with an audio format having less than the maximum data rate, whereas the streams 1 through 5 and 7 have the maximum data rate. In this case the FIFO output sequence comprises null blocks (i.e. dummy data blocks) that have replaced blocks having audio payload for stream 0 and stream 6 towards the end of the illustrated sequence. These null blocks were inserted when it was determined that the stream 0 FIFO 1110-1 and the stream 6 FIFO 1110-7 contained insufficient audio data (below the predetermined occupancy threshold) at the point in the buffer ordering sequence that they were selected by the FIFO read controller 1130 to read out an audio payload block. If, rather than inserting dummy data blocks, the stream 5 block, the stream 7 block and the stream 1 block at the end of the FIG. 15B sequence were output continuously then this would effectively temporarily increase the averaged transmission rates of stream 1 and stream 7, which would mean that more buffering would be required at the receiver. Insertion of the dummy data blocks evens out the averaged data transmission rates for the different data streams and as a consequence reduces the buffering requirements.

The invention may be embodied in software, programmable hardware (e.g. FPGA, ASIC), hardware or a combination of these. In the case of a software component, the invention also includes a providing (e.g. storage, transmission) medium by which such software is provided.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined in the appended claims.

I claim:

1. A transmitting method for use in a data communication system, said method comprising:

storing data from a respective plurality of input data streams in a plurality of buffers;

monitoring an occupancy level of each of said plurality of buffers to detect if said occupancy level is sufficient to provide a complete data block to a transmission data stream; and selecting, in turn, by a transmission controller, a buffer from said plurality of buffers to output a data block to said transmission data stream and associating with said data block a block label comprising an input stream identifier, said selection being performed according to a cyclic buffer selection order so as to generate a corresponding cyclic sequence of data blocks for transmission so that if said buffer selected by said transmission controller is detected to have an insufficient occupancy level when selected, a dummy data block of the same size as a data block is supplied to said transmission data stream in place of a data block from said selected buffer so that the dummy data block takes the place of a data block from said selected buffer in the cyclic sequence of data blocks for transmission, in which said plurality of input data streams comprise audio data, and said dummy data block comprises a block label distinguishing said dummy data block from an audio data block;

generating header data associated with a plurality of data blocks and adding said header data to said plurality of data blocks to form a data frame for output to said transmission data stream, where said header data comprises timing information for a plurality of base clocks; and generating configuration data for output to said transmission data stream, where said configuration data comprises data specifying a particular one of said plurality of base clocks to be associated with each of said plurality of input data streams and a sample rate multiplier specifying a relationship between said particular base clock and a sampling rate of said associated input data stream.

2. A programmable logic device for use with a plurality of input data streams stored in a respective plurality of buffers, said device being programmed so as to implement a method comprising:

monitoring an occupancy level of each of said plurality of buffers to detect if said occupancy level is sufficient to provide a complete data block to a transmission data stream; and selecting, in turn, by a transmission controller, a buffer from said plurality of buffers to output a data block to the transmission data stream and associating with said data block a block label comprising an input stream identifier, said selection being performed according to a cyclic buffer selection order so as to generate a corresponding cyclic sequence of data blocks for transmission so that if said buffer selected by said transmission controller is detected to have an insufficient occupancy level when selected, a dummy data block of the same size as a data block is supplied to said transmission data stream in place of a data block from said selected buffer so that the dummy data block takes the place of a data block from said selected buffer in the cyclic sequence of data blocks for transmission, in which said plurality of input data streams comprise audio data, and said dummy data block comprises a block label distinguishing said dummy data block from an audio data block;

generating header data associated with a plurality of data blocks and adding said header data to said plurality of data blocks to form a data frame for output to said transmission data stream, where said header data comprises timing information for a plurality of base clocks; and generating configuration data for output to said transmission data stream, where said configuration data comprises data specifying a particular one of said plurality of base clocks to be associated with each of said plurality of input data streams and a sample rate multiplier specifying a relationship between said particular base clock and a sampling rate of said associated input data stream.

3. A data communication system comprising:

a plurality of buffers for storing data from a respective plurality of input data streams;

logic to monitor an occupancy level of each of said plurality of buffers to detect if said occupancy level is sufficient to provide a complete data block to a transmission data stream;

a transmission controller to select, in turn, a buffer from said plurality of buffers to output a data block to said transmission data stream, said selection performed according to a cyclic buffer selection order so as to generate a corresponding cyclic sequence of data blocks for transmission; and a block label generator operable to associate with said data block, a block label comprising an input stream identifier;

in which:

if said buffer selected by said transmission controller is detected to have an insufficient occupancy level when selected, a dummy data block of the same size as a data block is supplied to said transmission data stream in place of a data block from said selected buffer so that the dummy data block takes the place of a data block from said selected buffer in the cyclic sequence of data blocks for transmission, said plurality of input data streams comprise audio data;

said dummy data block comprises a block label distinguishing said dummy data block from an audio data block;

a frame header generator operable to generate header data associated with a plurality of data blocks and operable to add said header data to said plurality of data blocks to form a data frame for output to said transmission data stream, where said header data comprises timing information for a plurality of base clocks;

a generator to generate configuration data for output to said transmission data stream, where said configuration data comprises data specifying a particular one of said plurality of base clocks to be associated with each of said plurality of input data streams and a sample rate multiplier specifying a relationship between said particular base clock and a sampling rate of said associated input data stream.

4. A data communication system according to claim 3, in which said block label comprises synchronization information.

5. A data communication system according to claim 3, in which said plurality of input data streams comprise input data streams each having a respective data format selected from a group of different data formats.

6. A data communication system according to claim 3, in which said plurality of input data streams comprise input data streams each having a respective data sampling rate selected from a group of different data sampling rates.

7. A data communication system according to claim 3, in which said configuration data comprises data specifying a data format associated with each of said plurality of input data streams.

8. A data communication system according to claim 3, in which said transmission controller is operable to supply said transmission data stream across a physical layer of a communication link using a predetermined communication protocol.

9. A data communication system according to claim 8, in which said predetermined communication protocol is Gigabit Ethernet.

* * * * *